United States Patent [19]

Drigani et al.

[11] Patent Number: 4,883,372
[45] Date of Patent: Nov. 28, 1989

[54] DEVICE TO CLAMP A ROLL ASSEMBLY HAVING A VERTICAL AXIS ON UNIVERSAL ROLLING STANDS

[75] Inventors: Fausto Drigani, Zugliano (UD); Alfredo Poloni, Fogliano Di Redipuglia, both of Italy

[73] Assignee: Danieli & C. Officine Meccaniche SpA, Buttrio, Italy

[21] Appl. No.: 310,652

[22] Filed: Feb. 15, 1989

[30] Foreign Application Priority Data

Mar. 4, 1988 [IT] Italy ............................... 83332 A/88

[51] Int. Cl.$^4$ ............................................. F16C 19/38
[52] U.S. Cl. .................................... 384/585; 384/584; 384/587; 384/620
[58] Field of Search ............... 384/585, 584, 587, 620, 384/537, 546, 418, 419

[56] References Cited

U.S. PATENT DOCUMENTS

| | | | |
|---|---|---|---|
| 2,032,490 | 3/1936 | Moore | 384/587 |
| 3,733,108 | 5/1973 | Petros | 384/585 |
| 3,851,934 | 12/1974 | Kufner | |
| 3,966,282 | 6/1976 | Overton | 384/584 |
| 4,043,622 | 8/1977 | Hotchkiss | 384/587 |

FOREIGN PATENT DOCUMENTS 2121816 11/1972 Fed. Rep. of Germany .
1960209 8/1974 Fed. Rep. of Germany .
2625731 12/1977 Fed. Rep. of Germany .

Primary Examiner—Lenard A. Footland
Attorney, Agent, or Firm—Wegner & Bretschneider

[57] ABSTRACT

Clamping device for a rolling ring assembly(10') which has a vertical axis and comprises a rotation axle (11') fitted to a bearing block (12'), a jacket (13') secured to the rotation axle (11') and supported by an end support (19') cooperating with the axle (11') and a bearing (14') installed in cooperation with the jacket (13'), a rolling ring (21') that forms a rolling body being fitted to the bearing (14') by means of clamping means including a pair of flanges (23'), the device comprising shoulder rings (30-31) consisting of at least one metallic element capable of being inserted in circumferential grooves (28-29) which are substantially perpendicular to the rotation axle (11') and which are formed in the inner wall of the rolling ring (21'), the shoulder rings (30-31) projecting from the grooves (28-29) by a predetermined distance and cooperating with the flanges (23') to clamp and keep in position the rolling ring (21') against the bearing (14').

7 Claims, 2 Drawing Sheets

DEVICE TO CLAMP A ROLL ASSEMBLY HAVING A VERTICAL AXIS ON UNIVERSAL ROLLING STANDS

This invention concerns a device to clamp a roll assembly having a vertical axis on universal rolling stands.

To be more exact, the invention concerns a device able to clamp and keep in position a rolling ring having a vertical axis and belonging to a universal rolling stand.

Rolling rings having a vertical axis on universal rolling stands are generally fitted so as to be able to rotate freely in appropriate bearing blocks cooperating with the stand itself.

When working, the rolling rings rotate at a very low speed (generally ranging between 40 and 120 r.p.m.) and undergo very great compression stresses in a radial direction.

An example of such a rolling ring is shown in FIG. 1, where the rolling ring assembly bears the reference number 10.

The rolling ring assembly comprises generally a bearing block 12 supporting an axle 11 to which is anchored a jacket 13 secured to the axle 11 by means of an end support 19 and a bolt 20.

A bearing 14 is fitted about the jacket 13 and cooperates on one side with an abutment 15 provided on the jacket and on its other side with a ring 16 cooperating with a bracket 17 and a set of fixture bolts 17 that mesh in threaded holes provided parallel to the axis of rotation of the rolling ring assembly 10 in the lower part of the jacket 13.

Moreover, the bearing 14 cooperates with a rolling ring 21, which is generally made of cast iron and forms the actual rolling body of the rolling ring assembly.

The rolling ring 21 is provided with two shoulders 25-26, in each of which is machined a set of threaded holes extending within the rolling ring 21 parallel to the axis of rotation of the rolling ring assembly 10.

A pair of flanges 22-23 obtains cooperation between the bearing 14 and the rolling ring 21 by means of bolts 24 meshing within the threaded holes.

The rolling ring assembly 10 is installed according to a standard procedure called a "package" procedure.

The above type of rolling ring assembly entails shortcomings and drawbacks. In particular, the threaded holes, whether blind or through holes, made in the rolling rings 21 for the passing of the bolts 24 have been found in practice to be very expensive.

Moreover, a corner zone 27 made on the rolling ring 21 so as to provide the shoulders 25-26 and the inclusion of the holes create points where stresses become concentrated. As these stresses are generally very great, breakage cracks are produced in the rolling ring 21 in the zone between the corner 27 and the bearing 14 and lead quickly to the rolling ring and the rolling ring assembly not being usable.

This invention has the purpose of obviating the shortcomings and drawbacks of the state of the art. This purpose is achieved by means of a device to clamp a rolling ring assembly having a vertical axis and possessing the features described in claim 1, while the dependent claims describe preferred forms of embodiment of the invention.

The device conforming to the invention comprises support elements and a bearing exactly the same as those employed by devices of the state of the art.

The substantial modifications applied in relation to such devices concern the rolling ring and the flange connecting it to the bearing.

In the example in question the rolling ring, which is generally made of cast iron and forms the rolling body, comprises a pair of circular grooves machined in the inner wall of the rolling ring and positioned perpendicular to the axis of rotation of the rolling ring.

A series of preferably metallic shoulder elements is fitted in the grooves along an extent which is less than the whole circumference of the grooves.

In other words the shoulder elements arranged one behind another form a ring located in each of the grooves; such ring is left incomplete on one side for reasons linked to the ability to remove these shoulder elements from the grooves.

The zone not covered by the ring of shoulder elements is filled by a further shoulder element integrally fixed to a flange that connects the cast iron rolling ring to the bearing. This embodiment enables the shortcomings and drawbacks typical of the state of the art to be eliminated.

In particular, this embodiment makes it possible to eliminate the costly process of forming blind threaded holes in the cast iron rolling ring and the creation of possible zones of formation of breakage cracks and therefore to provide an economical and very reliable rolling ring having a vertical axis on universal rolling stands.

Other advantages and merits of the invention will become clear on reading the following description of a form of embodiment of the invention, which is given as a nonrestrictive example with the help of the following Figures, wherein:

Figure 1:
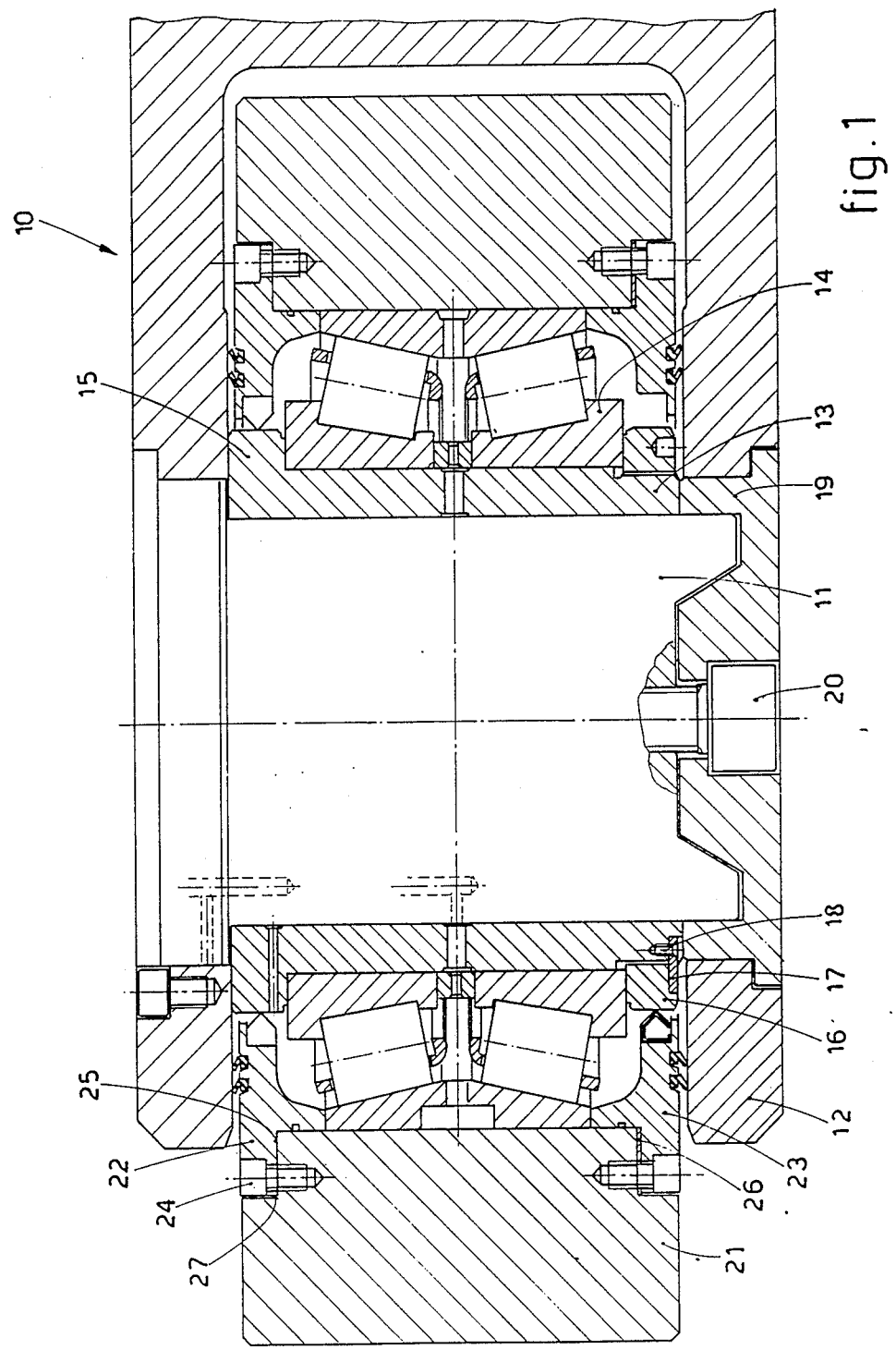
FIG. 1 shows a side view of a rolling ring assembly with a vertical axis for a universal rolling stand according to the state of the art.
Figure 2:
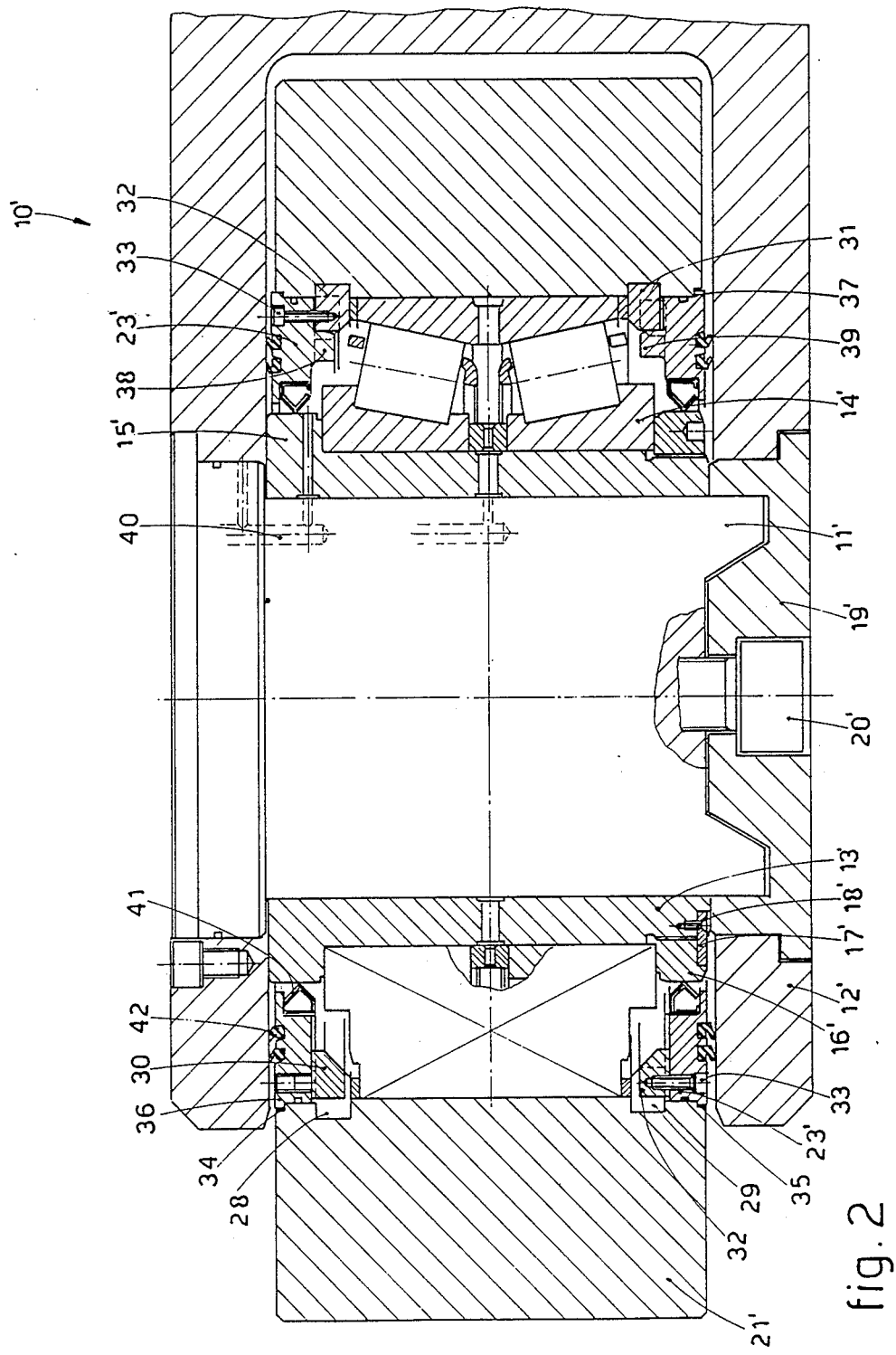
FIG. 2 shows a side view of a rolling ring assembly with a vertical axis for a universal rolling stand, the assembly being provided with a clamping device according to this invention.

Elements in FIG. 2 corresponding to those of FIG. 1 bear the same reference numbers plus an inverted comma. The reference number 10' in FIG. 2 denotes a rolling ring assembly with a vertical axis according to the invention. This assembly 10' contains some elements of the state of the art, namely an axle 11', a bearing block 12', a jacket 13', an end support 19', a bolt 20', a bearing 14', an abutment 15', a ring 16', a bracket 17' and fixture bolts 18'. These elements have already been described in the reference to the state of the art; they perform the same functions as those described regarding the device of FIG. 1 and therefore need not be described further.

A rolling ring 21' forming the rolling body cooperates with the bearing 14' by means of a clamping device conforming to this invention.

This clamping device provides for a pair of grooves 28-29 to be machined in the inner wall of the rolling ring 21'; the grooves 28-29 are separated from each other by a distance slightly greater than the width of the bearing 14'.

The residual axial play is set, as a rule, between 0.01 and 0.06 mm.

Shoulder rings 30-31, each of which consists of at least one element, are fitted in the grooves 28-29 and project therefrom by a pre-determined distance; at least two neighbouring metallic elements per ring will be arranged advantageously in each groove 28-29.

These shoulder rings 30-31 do not cover the whole circumference defined by each of the grooves 28-29 but, on the contrary, leave unfilled a zone corresponding to an angle of between 10° and about 40°. The purpose of this is to enable the shoulder rings 30-31 to be removed from the grooves 28-29 readily.

A further shoulder strip element 32 solidly secured by a bolt 33 to a connecting flange 23' is also fitted in each of the grooves 28-29. This shoulder strip element 32 fills the angular zone of between 10° and about 40° left free by each of the shoulder rings 30-31.

Moreover, the cast iron rolling ring 21' is provided with a pair of shoulder recesses 34-35 that cooperate with abutment protrusion 36-37 borne on the flanges 23'.

Lastly, each of the flanges 23' is equipped with a toric ring 38-39 to support the relative shoulder ring 30-31. The toric rings 38-39 perform also the functions of thrusting and clamping the shoulder rings 30-31.

Furthermore, during assembly a spacer ring is inserted into the spaces between the shoulder rings 30-31 and the outer race of the bearing 14'. The thickness of the spacer ring is determined by the formula:

$$D = A - 2B - C - X$$

where:

A is the distance between the outer walls of the grooves 30-31,

B is the width of each of the grooves 30-31,

C is the diameter of the outer race of the bearing 14', and

X is a number between 0.1 and 0.6 corresponding to the aforesaid residual axial play.

To complete the description, we can also note in FIG. 2 the inclusion of lubrication lines 40 (shown with lines of dashes) and packings for frontal 41 and circumferential 42 sealing purposes.

The element constituting the shoulder rings are advantageously indicated as being metallic but may also consist of any other material such as a ceramic material, composite resin, plastic, etc.

We claim:

1. Clamping device for a rolling ring assembly (10') which has a vertical axis and comprises a rotation axle (11') fitted to a bearing block (12'), a jacket (13') secured to the rotation axle (11') and supported by an end support (19') cooperating with the axle (11') and a bearing (14') installed in cooperation with the jacket (13'), a rolling ring (21') that forms a rolling body being fitted to the bearing (14') by means of clamping means including a pair of flanges (23'), the device being characterized in that it comprises shoulder rings (30-31) consisting of at least one metallic elements capable of being inserted in circumferential grooves (28-29) which are substantially perpendicular to the rotation axle (11') and which are formed in the inner wall of the rolling ring (21'), the shoulder rings (30-31) projecting from the grooves (28-29) by a pre-determined distance and cooperating with the flanges (23') to clamp and keep in position the rolling ring (21') against the bearing (14').

2. Device as claimed in claim 1, in which each of the shoulder rings (30-31) consists of at least two neighbouring metallic elements.

3. Device as claimed in claim 1, in which the overall linear length of each of the shoulder rings (30-31) is smaller than the perimeter of the grooves (28-29) and a further shoulder strip element (32) is fitted in the space between the ends of each of the shoulder rings (30-31), such further shoulder strip element (32) being connected rigidly to the flange (23').

4. Device as claimed in claim 1, in which the shoulder rings (30-31) are separated from each other by a distance slightly greater than the width of the bearing (14').

5. Device as claimed in claim 4, in which at least one spacer ring is included between each of the shoulder rings (30-31) and the bearing (14').

6. Device as claimed in claim 1, in which each of the flanges (23') is equipped with a toric ring (38-39) to support, thrust and clamp the shoulder rings (30-31).

7. Device as claimed in claim 1, in which the rolling ring (21') is provided with shoulder recesses (34-35) that cooperate with abutment protrusions (36-37) borne on the flanges (23').

* * * * *